US008743413B2

(12) United States Patent
Tsuji

(10) Patent No.: US 8,743,413 B2
(45) Date of Patent: Jun. 3, 2014

(54) TAPE PRINTING SYSTEM AND TAPE PRINTING METHOD BASED ON PRINTING TAPE TYPE

(75) Inventor: Akinori Tsuji, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 212 days.

(21) Appl. No.: 13/050,244

(22) Filed: Mar. 17, 2011

(65) Prior Publication Data

US 2011/0236106 A1 Sep. 29, 2011

(30) Foreign Application Priority Data

Mar. 29, 2010 (JP) ................................ 2010-075426

(51) Int. Cl.
*G06K 15/00* (2006.01)

(52) U.S. Cl.
USPC ................ 358/1.18; 400/10; 400/30; 400/36; 400/39

(58) Field of Classification Search
USPC ..................................... 400/1-134, 191-250
See application file for complete search history.

(56) References Cited

U.S. PATENT DOCUMENTS

| | | | |
|---|---|---|---|
| 6,979,139 B2 | 12/2005 | Hine et al. | |
| 7,112,000 B2 | 9/2006 | Kurashina et al. | |
| 7,995,222 B2 | 8/2011 | Handa et al. | |
| 2005/0105104 A1 | 5/2005 | Sakai et al. | |
| 2008/0247798 A1 * | 10/2008 | Buzuev et al. | 400/67 |
| 2009/0219551 A1 | 9/2009 | Sakai et al. | |

FOREIGN PATENT DOCUMENTS

| | | | |
|---|---|---|---|
| CN | 1460598 | A | 12/2003 |
| CN | 1689822 | A | 11/2005 |
| CN | 101011890 | A | 8/2007 |
| CN | 101037055 | A | 9/2007 |
| JP | 06-040116 | A | 2/1994 |
| JP | 2001-310540 | A | 11/2001 |
| JP | 2005-014524 | A | 1/2005 |
| JP | 2005-132051 | A | 5/2005 |
| JP | 2007-203676 | A | 8/2007 |

* cited by examiner

*Primary Examiner* — Benny Q Tieu
*Assistant Examiner* — Marcellus Augustin
(74) *Attorney, Agent, or Firm* — ALG Intellectual Property, LLC

(57) ABSTRACT

A tape printing system includes a control apparatus and a tape printer, wherein the control apparatus includes an image data generating section generating character strings and/or image data, and an image data transmitting section transmitting the generated character strings and/or image data to the tape printer, and the tape printer includes a processing pattern storing section storing a processing pattern for each tape type, the processing pattern of processing the character strings and/or image data to printing image data, a tape type determining section determining the tape type of a printing tape, an image data receiving section receiving the character strings and/or image data from the data transmitting section, a printing image data generating section generating printing image data by processing the received character strings and/or image data based on the processing pattern, and a tape printing section printing the generated printing image data on the printing tape.

12 Claims, 10 Drawing Sheets

A TRANSFER TAPE IS PLACED.
IMAGE DATA IS FLIPPED VERTICALLY
AND PRINTED BY THE MAIN BODY.
CONTINUE PRINTING?
[YES] [NO]

FIG. 7A

A TRANSFER TAPE IS PLACED.
AT THE TIME OF PRINTING, IMAGE
DATA IS FLIPPED VERTICALLY AND
PRINTED BY THE MAIN BODY.
[OK]

FIG. 7B

A TRANSFER TAPE IS PLACED.
IMAGE DATA WAS FLIPPED
VERTICALLY AND PRINTED BY THE
MAIN BODY.
[OK]

FIG. 7C

TAPE PRINTING SYSTEM AND TAPE PRINTING METHOD BASED ON PRINTING TAPE TYPE

CROSS-REFERENCE

The present application claims priority from Japanese Patent Application No. 2010-075426 filed on Mar. 29, 2010, which is hereby incorporated by reference in its entirety.

BACKGROUND

In the past, as a tape printing system, a tape printing system provided with a tape printer which prints image data on a printing tape and a computer which generates image data and transmits the image data to the tape printer has been known (see Japanese Patent Publication No. 2005-14524). The computer obtains, from the tape printer, the type of a printing tape placed in the tape printer, and, after performing image processing according to the type on the image data, transmits the processed image data to the tape printer.

However, in the above-described configuration, when image processing is performed on the image data, it is necessary to transmit information such as the type of a printing tape and margin setting between the computer and the tape printer by data communication. For example, in image processing corresponding to a transfer tape, it is necessary to flip the image data vertically and add a margin on both sides of the image data. However, the margin length varies depending on the characteristics (a difference among models, such as a tape feed rate) of the tape printer. Since the computer generates printing image data while taking these variations into consideration, the operation becomes undesirably complicated. Moreover, different image processing may be needed depending on the characteristics of each tape printer, making it impossible to perform image processing according to the characteristics of each tape printer.

SUMMARY

Various embodiments may provide a tape printing system and a tape printing method which can generate printing image data by performing processing according to the type of a printing tape and the characteristics of each tape printer on image data from a control apparatus.

According to at least one embodiment of the disclosure, there is provided a tape printing system including a control apparatus generating character strings and/or image data and a tape printer which are connected to each other, wherein the control apparatus includes an image data generating section generating the character strings and/or image data, and an image data transmitting section transmitting the generated character strings and/or image data to the tape printer, and the tape printer includes a processing pattern storing section storing a processing pattern for each tape type, the processing pattern of processing the character strings and/or image data to printing image data, a tape type determining section determining the tape type of a printing tape placed in a tape receiving section, an image data receiving section receiving the character strings and/or image data from the data transmitting section, a printing image data generating section generating printing image data by performing, on the received character strings and/or image data, processing based on the processing pattern according to the tape type, and a tape printing section printing the generated printing image data on the printing tape.

According to at least one embodiment of the disclosure, there is provided a tape printing method of a tape printing system including a control apparatus generating character strings and/or image data and a tape printer which are connected to each other, the method including: allowing the control apparatus to generate the character strings and/or image data; allowing the control apparatus to transmit the generated character strings and/or image data to the tape printer; allowing the tape printer to receive the character strings and/or image data from the control apparatus; allowing the tape printer to determine the tape type of a printing tape placed in a tape receiving section; allowing the tape printer to generate printing image data by performing, on the received character strings and/or image data, processing based on a processing pattern according to the tape type; and allowing the tape printer to print the generated printing image data on the printing tape.

According to these configurations, since processing (image processing) according to the type of a printing tape (the tape type) is performed in the tape printer, it is possible to perform processing according to the tape type and the characteristics of each tape printer without performing data transmission from the tape printer to the control apparatus. Therefore, it is possible to perform processing according to the tape type and the characteristics of each tape printer easily. Incidentally, the "character strings and/or image data" here means character strings and/or image data which gives no consideration to the printing tape placed in the tape printer and the characteristics of the tape printer. As a result, the control apparatus can generate the character strings and/or image data without being limited by the model of the tape printer to which the control apparatus is connected and the tape type, the tape width, and the like.

In the tape printing system described above, the printing image data generating section may generate printing image data by performing, on the received character strings and/or image data, processing according to the characteristics of the tape printer based on the processing pattern according to the tape type.

In this case, the tape type determining section may determine whether or not the tape type of the printing tape placed in the tape receiving section is a "transfer tape" which transfers the printing image data printed on the printing tape to another member, and, when the tape type is determined to be a "transfer tape", the printing image data generating section perform, as the processing pattern according to the tape type, processing to flip the character strings and/or image data vertically.

In this case, when the tape type is determined to be a "transfer tape", the printing image data generating section may perform, as the processing according to the characteristics of the tape printer, processing to add a margin region having a length set for each tape printer to front and back parts of a printing region in a tape length direction, the printing region based on the character strings and/or image data.

In this case, processing according to the characteristics of the tape printer may include one or more of processing according to the feed rate of the printing tape, processing according to the pressure applied by a print head, and processing according to a head/cutter distance which is a distance between a tape cutter which cuts the printing tape and the print head.

According to these configurations, even when a transfer tape is placed as a printing tape, it is possible to perform processing corresponding to the transfer tape.

BRIEF DESCRIPTION OF THE DRAWINGS

Non-limiting and non-exhaustive embodiments of the present disclosure will be described with reference to the accompanying drawings, wherein like reference numbers reference like elements.

FIG. 7A is a diagram showing a printing selection screen, FIG. 7B is a diagram showing a placement notifying screen, and FIG. 7C is a diagram showing a printing completion notifying screen.

DESCRIPTION OF EMBODIMENTS

Figure 1:
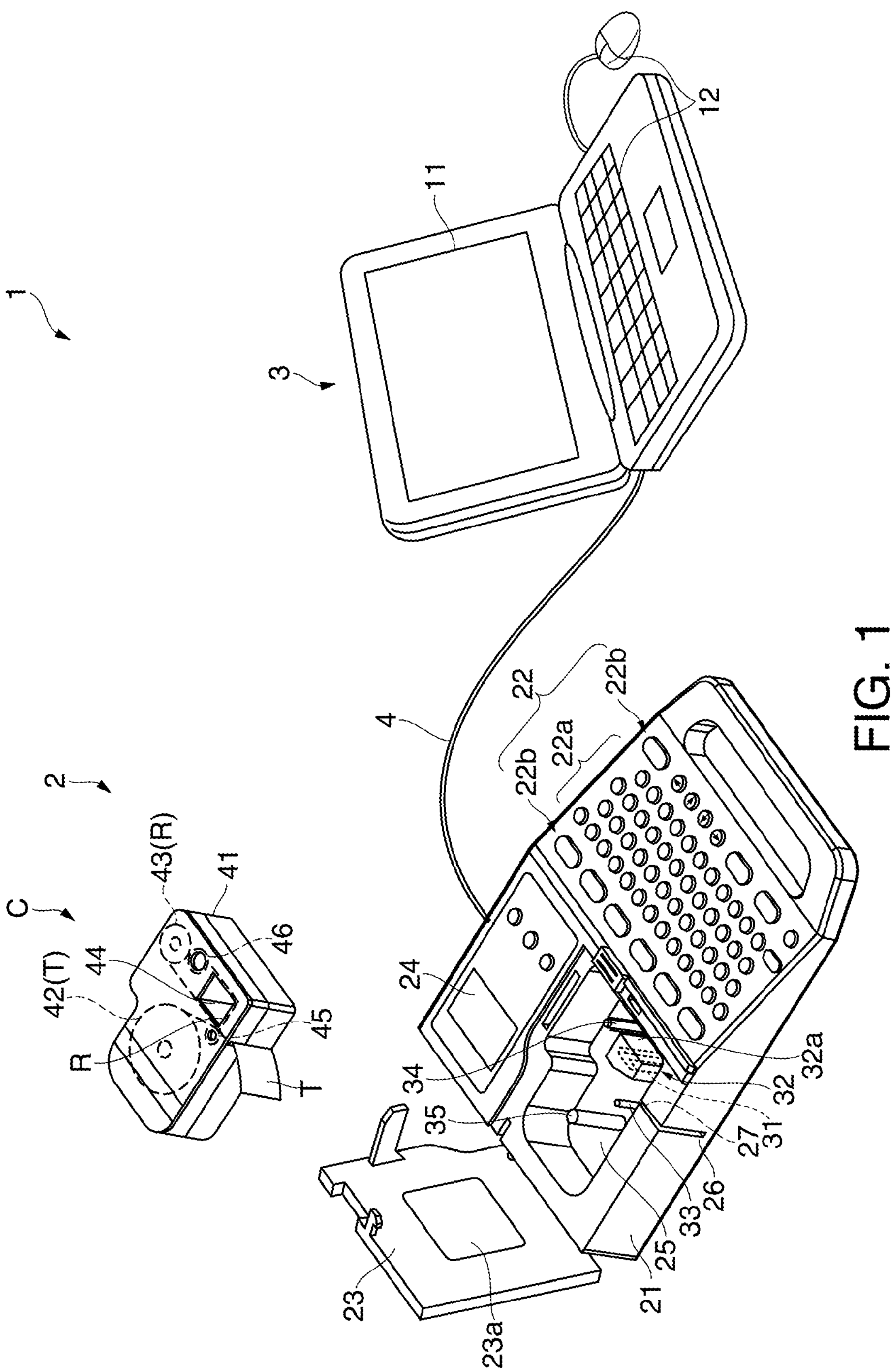
FIG. 1 is a system configuration diagram showing a tape printing system according to an embodiment.

Hereinafter, a tape printing system according to the invention will be described with reference to the accompanying drawings. FIG. 1 is a system configuration diagram showing a tape printing system 1. As shown in FIG. 1, the tape printing system 1 includes a tape printer 2 and a computer (a control apparatus) 3 controlling the tape printer 2. The tape printer 2 and the computer 3 are connected to each other via a cable 4 or the like. Incidentally, in this embodiment, the tape printer 2 and the computer 3 are assumed to be connected to each other via wire communication; however, they may be connected to each other via wireless communication.

The computer 3 is a common personal computer having a display section 11 (a display) and an entry section 12 (a keyboard and a mouse). On the other hand, the tape printer 2 can make a label sheet and a retransfer sheet by performing printing based on image data A obtained from the computer 3. In particular, this tape printing system 1 has a function of performing, in the tape printer 2, image processing (corresponding image processing) according to the type of a printing tape T and the characteristics of the tape printer 2 when the printing tape T placed in the tape printer 2 is a transfer tape T2.

Here, first, an apparatus configuration of the tape printer 2 will be described. FIG. 1 shows a state in which an opening and closing lid 23 of the tape printer 2 is opened. The outer shell of the tape printer 2 is formed of an apparatus case 21. The apparatus case 21 has a keyboard 22 on the front upper face thereof, the keyboard 22 provided with various entry keys, and has the opening and closing lid 23 in the left portion on the back upper face thereof and a display screen 24 in the right portion on the back upper face thereof. Under the opening and closing lid 23, a cartridge placement section (a tape receiving section) 25 into which a tape cartridge C is placed is formed as a concave portion, and the tape cartridge C is detachably placed into the cartridge placement section 25 in a state in which the opening and closing lid 23 is opened. Moreover, the opening and closing lid 23 has an observation window 23*a* which allows the attachment/detachment of the tape cartridge C to be visually observed in a state in which the opening and closing lid 23 is closed.

On the keyboard 22, a character key group 22*a* and a function key group 22*b* for specifying various operation modes or the like are arranged. The display screen 24 is a liquid crystal display, and is used when the user checks the entered information entered by using the keyboard 22, settings of the tape printer 2, and the like.

On the left side of the apparatus case 21, a tape ejection port 26 which makes the cartridge placement section 25 communicate with the outside is formed, and a tape cutter 27 for cutting the sent printing tape T faces the tape ejection port 26. A predetermined length of the printing tape T on which printing is performed is sent through the tape ejection port 26, and, by driving a cutter motor 28 (see FIG. 4) in a state in which the movement of the printing tape T is temporarily stopped, the printing tape T on which printing is performed is cut by the tape cutter 27. In this way, a strip label sheet or transfer sheet is made.

On the other hand, the cartridge placement section 25 is provided with a head unit 32 having a thermal-type print head 31 built into a head cover 32*a*, a platen driving shaft 33 facing the print head 31, a take-up driving shaft 34 which takes up an ink ribbon R, which will be described later, and a positioning projection 35 of a tape reel 42, which will be described later. Moreover, under the cartridge placement section 25, a tape feed motor 36 (see FIG. 4) which rotates the platen driving shaft 33 and the take-up driving shaft 34 is embedded.

The tape cartridge C houses, in an upper center portion inside a cartridge case 41, the tape reel 42 around which a printing tape T having a predetermined width (about 4 to 48 mm) is wound and, in a right lower portion, a ribbon reel 43 around which the ink ribbon R is wound, and the printing tape T and the ink ribbon R have the same width. Moreover, in a left lower portion of the tape reel 42, a through hole 44 into which the head cover 32*a* covering the head unit 32 is inserted is formed. Furthermore, in a position corresponding to a portion of the head unit 32 inserted into the through hole 44, the position in which the printing tape T and the ink ribbon R are placed one on top of another, a platen roller 45 into which the platen driving shaft 33 fits, the platen roller 45 driven and rotated by the platen driving shaft 33, is disposed. On the other hand, near the ribbon reel 43, a ribbon take-up reel 46 is disposed, and the ink ribbon R unreeled from the ribbon reel 43 is placed so as to go around the head cover 32*a*, and is taken up by the ribbon take-up reel 46.

When the tape cartridge C is placed into the cartridge placement section 25, the through hole 44 fits onto the head cover 32*a*, a central hole of the tape reel 42 fits onto the positioning projection 35, and a central hole of the ribbon take-up reel 46 fits onto the take-up driving shaft 34, and the print head 31 is brought into contact with the platen roller 45 with the printing tape T and the ink ribbon R sandwiched between them, whereby printing is made possible.

As the printing tape T placed into the tape cartridge C, different types of printing tape T are prepared, and one of these printing tapes T (and an ink ribbon R) is housed in each cartridge case 41. Moreover, on the back of the cartridge case 41, a plurality of holes (not shown) for specifying the type of the tape cartridge C are provided. In addition, a plurality of tape identification sensors (a tape type determining section) 37 (see FIG. 4) which detect the plurality of holes are provided in the cartridge placement section 25 in positions corresponding to these holes. By detecting the state of the holes by the tape identification sensors 37, it is possible to determine the type of the printing tape T. Incidentally, the tape identification sensor 37 is formed of a microswitch or the like.

Figure 2A:
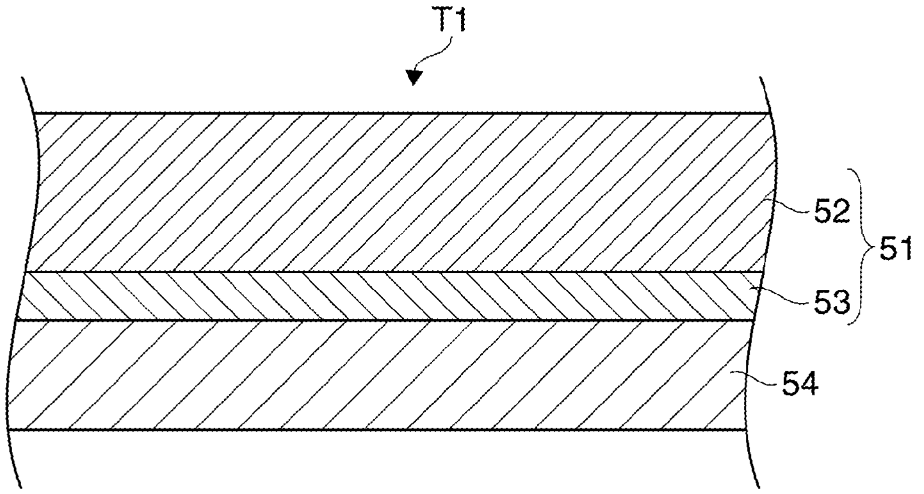
FIG. 2A is a sectional view showing a label tape.

In this embodiment, for example, two types of printing tape T, a label tape T1 for making a label sheet and a transfer tape T2 for making a retransfer sheet, are prepared. As shown in a sectional view of FIG. 2A, the label tape T1 is formed of a printing base material tape 51 which is a printing base material 52 serving as a printing surface and having a back face to which an adhesive 53 is applied and release paper 54 attached to the printing base material tape 51 by the adhesive 53, the printing base material tape 51 and the release paper 54 which are laid one on top of another. That is, the image data A is printed on the front surface of the printing base material 52. The label sheet thus made is used as follows. After the release paper 54 is removed from the printing base material 52 on which the image data A is printed, the printing base material 52 is attached to an object.

Figure 2B:
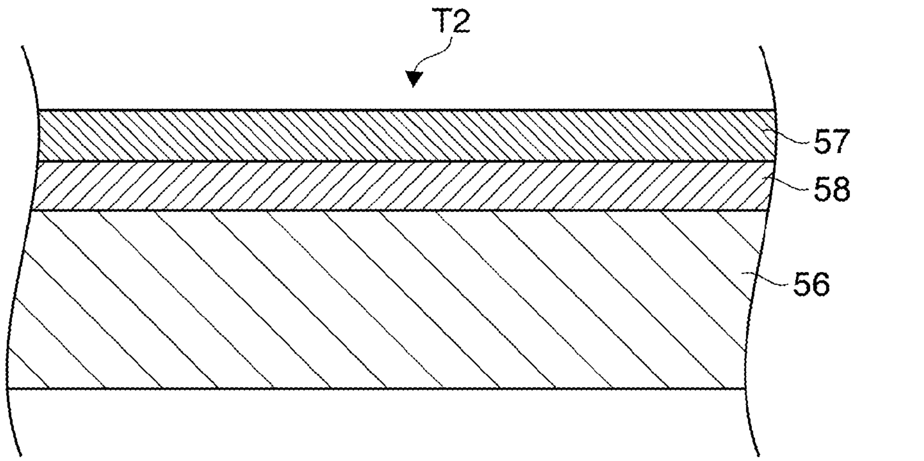
FIG. 2B is a sectional view showing a transfer tape.

As shown in a sectional view of FIG. 2B, the transfer tape T2 is formed of a retransfer base material 56 made of polyethylene terephthalate or the like, the retransfer base material 56 having a front surface on which a surface treatment layer 57 for receiving ink to be thermal-transferred is laid. Moreover, between the retransfer base material 56 and the surface treatment layer 57, an anchor layer 58 for making the surface treatment layer 57 loosely adhere to the retransfer base material 56 is provided. That is, the image data A is printed on the front surface of the surface treatment layer 57. The retransfer sheet thus made is used as follows. The retransfer sheet is placed on an object to which retransfer is performed, and is rubbed from the back face thereof with a transfer stick (not shown) of the tape printer 2. As a result, the surface treatment layer 57 is peeled from the anchor layer 58, and the ink is retransferred to the object along with the surface treatment layer 57.

The tape printer 2 performs intended printing on the printing tape T by making the tape feed motor 36 unreel the printing tape T from the tape cartridge C and selectively making the heater element of the print head 31 generate heat with the printing tape T placed on the ink ribbon R. The printed part of the printing tape T is sent through the tape ejection port 26 to the outside at any time. At the completion of printing, after sending the printing tape T to a position of a tape length including a margin, the tape feed motor 36 stops the movement of the printing tape T (and then the procedure proceeds to cutting processing).

Figure 3:
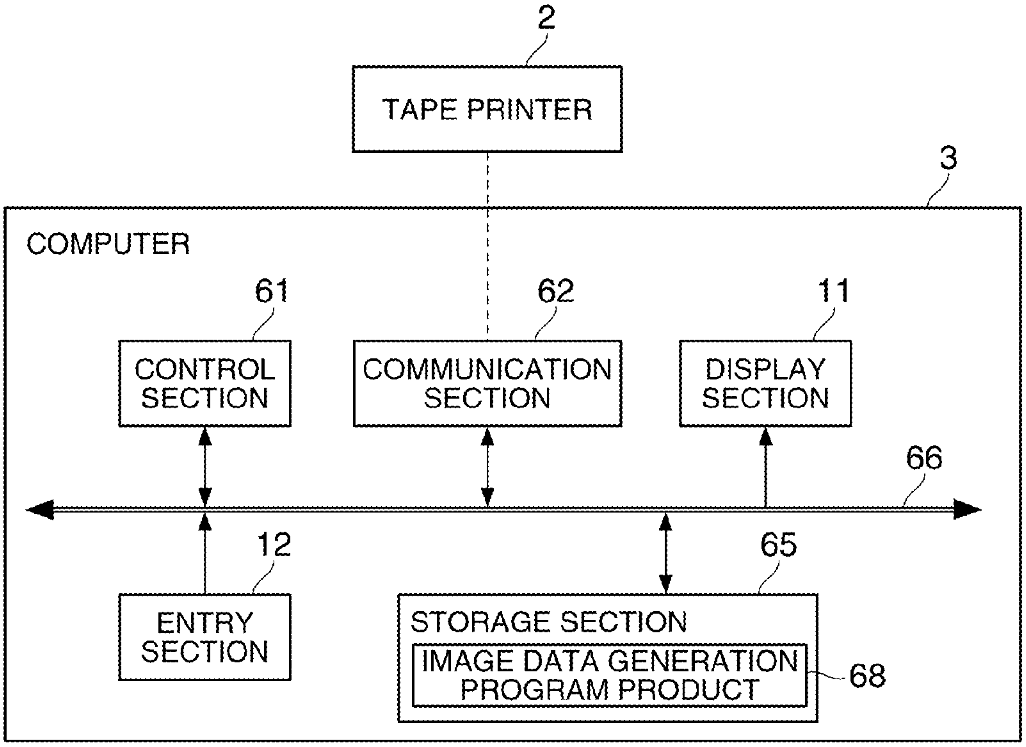
FIG. 3 is a control block diagram showing a control system of a computer.
Figure 4:
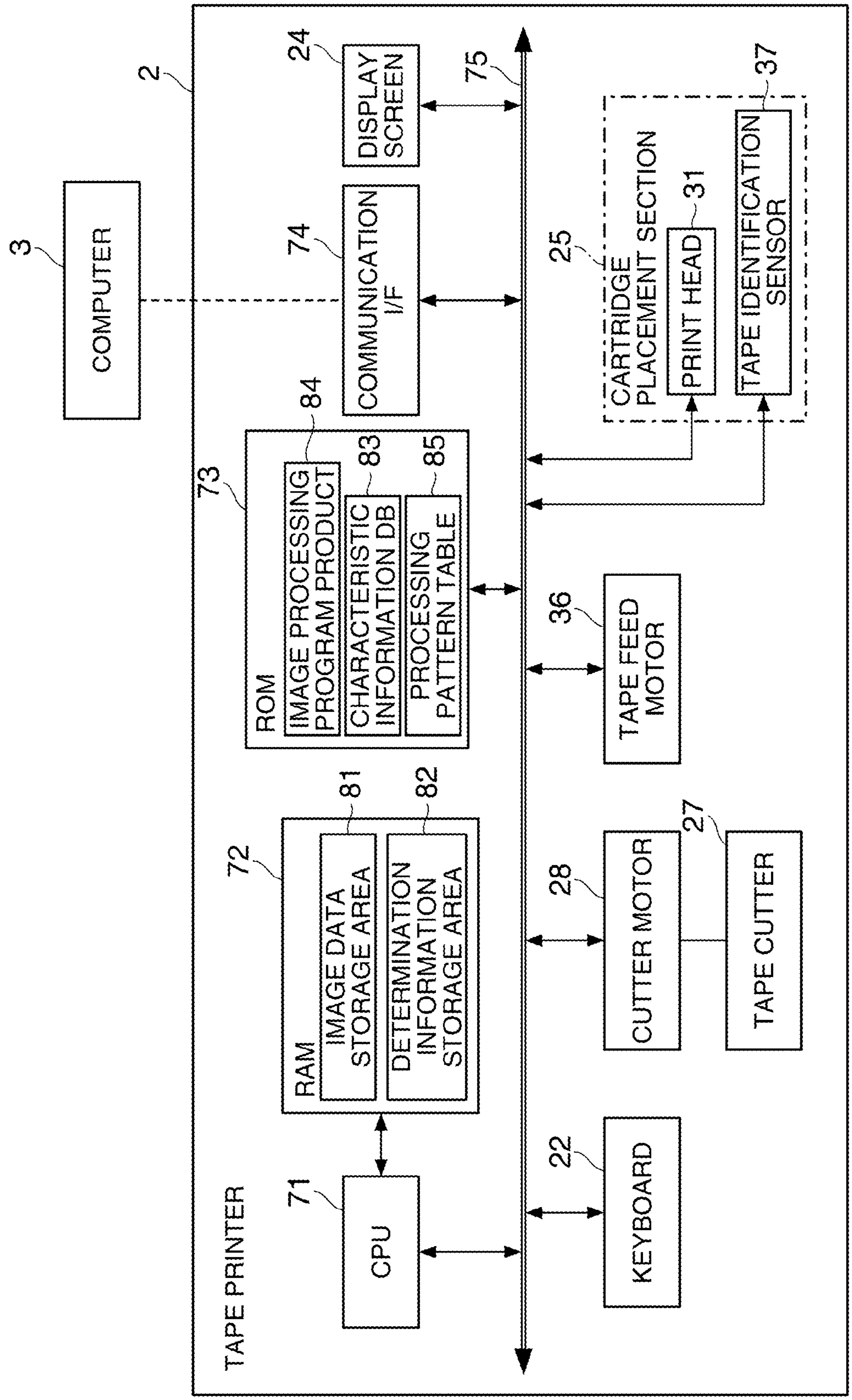
FIG. 4 is a control block diagram showing a control system of a tape printer.

Next, with reference to control block diagrams of FIGS. 3 and 4, control configurations of the computer 3 and the tape printer 2 will be described. As shown in FIG. 3, the computer 3 includes a control section 61, a communication section (an image data transmitting section) 62, a display section 11, an entry section 12, and a storage section 65, and these sections are connected to each other via a bus 66.

The control section 61 is formed of a CPU, RAM, ROM (read only memory), and the like (of which none is illustrated), and controls the whole of the computer 3. Moreover, the communication section 62 performs communication (input and output of information) with the tape printer 2. In this embodiment, the communication section 62 is mainly used to transmit generated image data A, receive printing tape T type determination information, which will be described later, and transmit the selection result obtained by the selection screen.

The storage section 65 is formed of an HDD (hard disk), and stores an image data generation program product 68. The image data generation program product 68 is a program product generating image data A to be printed on the printing tape T. That is, the control section 61 functions as an image data generating section by executing the image data generation program product 68. Specifically, the image data generation program product 68 displays an entry screen for making the user enter a character, graphics, the layout thereof, and the like, and generates the image data A based on the entered information. Incidentally, the image data A generated by the program product is not limited to the data on the layout of a character or graphics, and may be the data on the layout of a captured photo image or the like.

Then, a control configuration of the tape printer 2 will be described with reference to FIG. 4. The tape printer 2 includes a CPU (central processing unit) 71, RAM (random access memory) 72, ROM (read only memory) 73, a communication interface (an image data receiving section) 74, the display screen 24, the keyboard 22, the cutter motor 28, the tape cutter 27, the tape feed motor 36, the print head 31, and the tape identification sensor 37, and, as shown in the drawing, the component elements are connected to each other via a bus 75.

The RAM 72 is directly connected to the CPU 71 which is a central processing unit, and is used as a work area when the CPU 71 performs various kinds of control. Moreover, the RAM 72 has an image data storage area 81 which stores the image data A obtained from the computer 3 and a determination information storage area 82 which stores the type of a printing tape T, the type obtained by the determination.

The ROM 73 stores control data and a control program product which are used by the CPU 71 for performing various kinds of control. Specifically, as the control data, the ROM 73 stores a characteristic information database 83 storing the characteristics of the tape printer 2 and a processing pattern table (a processing pattern storing section) 85 storing a processing pattern according to a tape type. Incidentally, the characteristics of the tape printer 2 here are the characteristics of each model such as the characteristics of the print head 31, the characteristics of the tape feed motor 36, the characteristics based on the layout of these elements, and the like. Moreover, it is assumed that the characteristics of each tape printer 2 are stored in the characteristic information database 83 at the time of shipment. Incidentally, the processing pattern here is a pattern of processing for generating image data A for printing from the image data A generated by the computer 3. In addition, the processing pattern table 85 stores at least a processing pattern according to a transfer tape T2.

Specifically, as the control program product, the ROM 73 stores an image processing program product 84. The image processing program product 84 is a program product which performs corresponding image processing on the image data A when the printing tape T placed in the tape cartridge is determined to be a transfer tape T2. The corresponding image processing is image processing according to the type of the printing tape T placed in the tape cartridge and the characteristics of each tape printer 2. That is, the CPU 71 functions as a printing image data generating section by executing the image processing program product 84.

The communication interface 74 performs communication with the computer 3, and, in this embodiment, is mainly used to receive the image data A, transmit the type of a printing tape T (the determination information), and receive the selection result obtained by the selection screen, which will be described later.

The cutter motor 28 is connected to the tape cutter 27, and functions as a cutting section. Moreover, the tape feed motor 36 and the print head 31 function as a tape printing section for printing the image data A on the printing tape T. As described above, the print head 31 and the tape identification sensor 37 are provided in the cartridge placement section 25, and the tape identification sensor 37 detects the type of the printing tape T placed in the tape cartridge C. The CPU 71 performs control of communication with the computer 3, display control of the display screen 24, and drive control of the printing operation and cutting operation.

Figure 5A:
FIG. 5A is a diagram showing an example of image data before corresponding image processing.
Figure 5B:
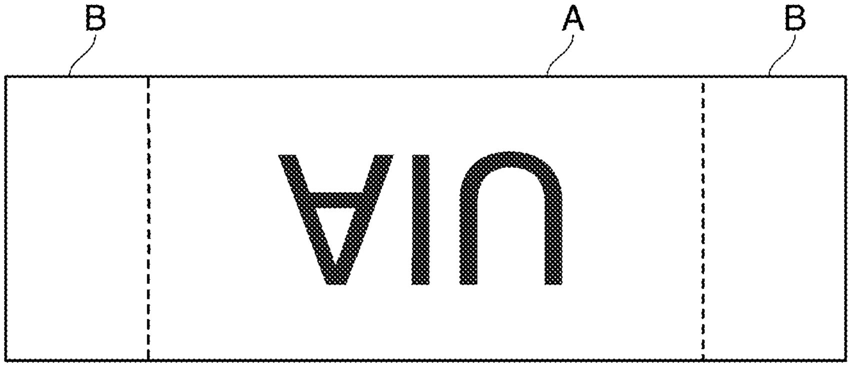
FIG. 5B is a diagram showing an example of image data after corresponding image processing.

Here, the corresponding image processing based on the processing pattern corresponding to the transfer tape T2 will be described with reference to FIGS. 5A and 5B. FIG. 5A shows an example of the image data A before corresponding image processing, and FIG. 5B shows the image data A of FIG. 5A, the image data A subjected to the corresponding image processing, as an example of the image data A subjected to the corresponding image processing corresponding to the transfer tape T2. As shown in FIG. 5B, in the corresponding image processing corresponding to the transfer tape T2, the image data A is flipped vertically (from top to bottom), and margins B are added to the sides of the image data A in the tape length direction. The length of the margin B in the tape length direction is determined based on the characteristics of each tape printer 2, the characteristics stored in the characteristic information database 83. By adding the margins B to the sides of the image data A, it is possible to rub the retransfer sheet while holding the both of left and right sides of the retransfer sheet. This makes it easier to perform retransfer on an object. Moreover, by adding the margin B according to the characteristics of each tape printer 2, it is possible to make the front surface of the retransfer base material 56 receive the ink smoothly. Incidentally, the characteristics of each tape printer 2 here include the feed rate of the printing tape T, any one of the pressure applied by the print head 31 and a head/cutter distance which is a distance between the tape cutter 27 which cuts the printing tape T and the print head or both, etc. Incidentally, regarding the above characteristics, in addition to the margin setting, printing density adjustment, character interval adjustment, etc. may be performed.

Next, printing operation in the tape printing system will be described with reference to FIG. 6. Here, descriptions include printing tape T type determination operation which is the operation performed before printing operation.

Figure 6:
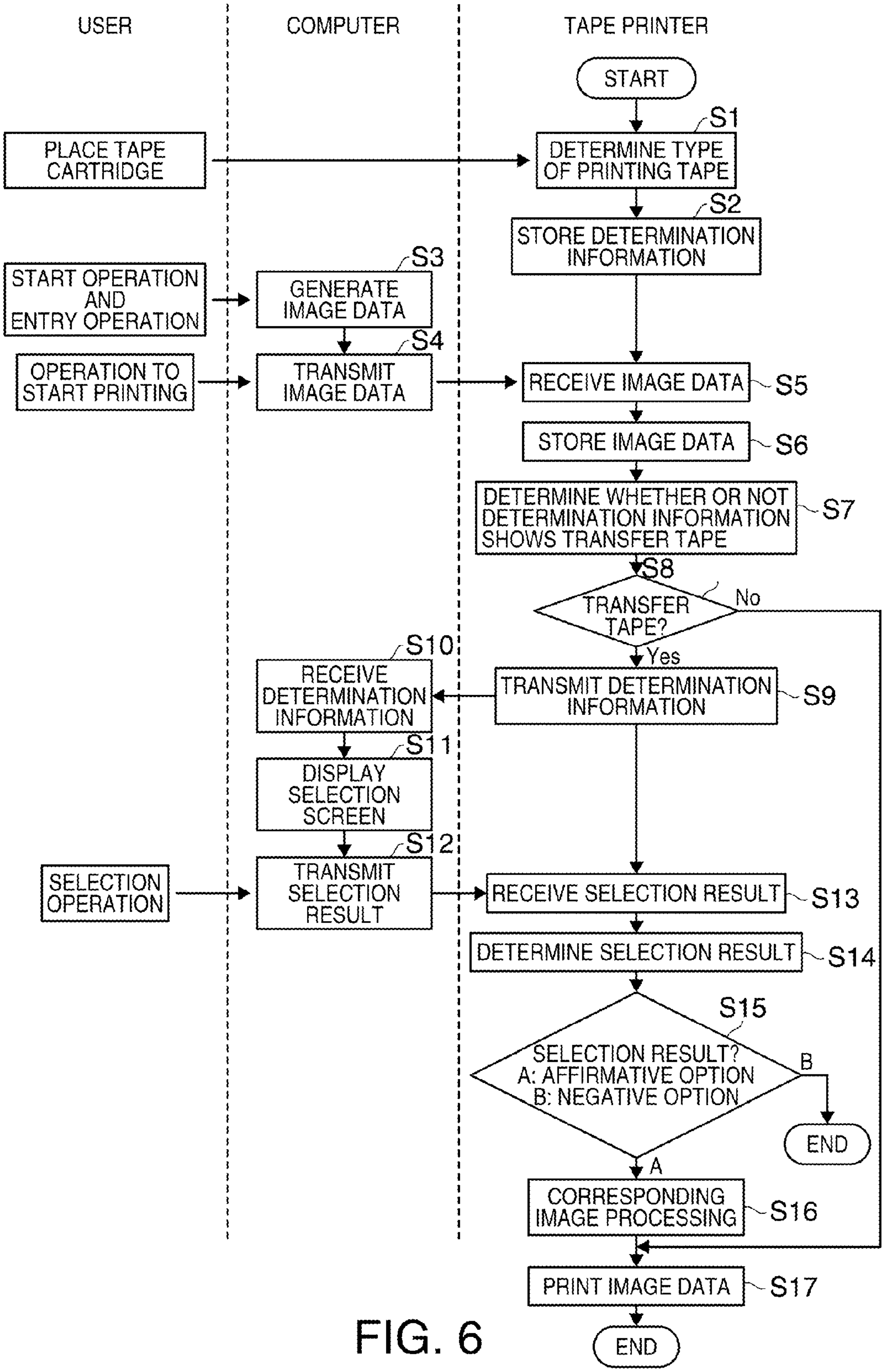
FIG. 6 is a flowchart showing printing operation which is performed by the tape printing system.

As shown in FIG. 6, first, when the user places the tape cartridge C, the tape printer 2 determines the type of the printing tape T placed in the tape cartridge C (S1). Specifically, when the tape cartridge C is placed and the opening and closing lid 23 is closed, the tape printer 2 determines the type of the printing tape T placed in the tape cartridge C by the tape identification sensor 37 (a tape type determination step). When the type of the printing tape T is determined, the tape printer 2 stores the determination information (the type of the printing tape T) thus obtained in the determination information storage area 82 (S2).

Next, when the user performs operation to start the image data generation program product 68, the computer 3 generates image data A (S3) (an image data generation step). Specifically, with the start operation, the computer 3 starts the image data generation program product 68, and displays the entry screen on the display section 11 according to the image data generation program product 68. Then, the computer 3 generates the image data A based on the entered information. Incidentally, the image data A thus generated is character strings and/or image data in the appended claims. That is, the image data A thus generated is image data A on which corresponding image processing is performed, and is character strings and/or image data A which becomes image data A for printing according to each tape type depending on the processing pattern.

After that, when the user performs operation to start printing, the computer 3 transmits the generated image data A to the tape printer 2 (S4) (an image data transmission step). For example, when a printing button displayed on the display section 11 is pressed, the computer 3 transmits the image data A via the communication section 62.

On the other hand, when the tape printer 2 receives the image data A from the computer 3 via the communication interface 74 (S5), the tape printer 2 stores the image data A thus received in the image data storage area 81 (S6). After storing the image data A, the tape printer 2 determines whether or not the determination information stored in the determination information storage area 82 is a transfer tape T2 (a predetermined type) (S7). If the determination information is not a transfer tape T2 (S8: No), the tape printer 2 prints the image data A stored in the image data storage area 81 on the printing tape T by using the tape feed motor 36 and the print head 31 (S17). On the other hand, if the determination information is a transfer tape T2 (S8: Yes), immediately after receiving the image data A via the communication interface 74, the tape printer 2 transmits the determination information which is the type of the printing tape T, the type obtained by the determination (the information indicating that the printing tape T is a transfer tape T2), to the computer 3 (S9).

When the computer 3 receives the determination information via the communication section 62 (S10), the computer 3 displays, immediately after receiving the determination information, a selection screen on the display section 11, the selection screen asking whether or not to perform printing by performing corresponding image processing according to the type (the transfer tape T2) indicated by the determination information (a selection screen display section) (S11). For example, as shown in FIG. 7A, a selection screen showing a message "A TRANSFER TAPE IS PLACED IN THE MAIN BODY. IMAGE DATA IS FLIPPED VERTICALLY AND PRINTED BY THE MAIN BODY. CONTINUE PRINTING? [YES] [NO]" is displayed. This message makes the user make a selection as to whether or not to perform printing by performing the corresponding image processing. When any option is selected, the computer 3 transmits the selection result to the tape printer 2 via the communication section 62 (S12).

When the tape printer 2 receives the selection result via the communication interface 74 (S13), the tape printer 2 determines whether the selection result is an affirmative option ([YES]) or a negative option ([NO]) to the image processing (S14). If the selection result is a negative option (S15: B), the tape printer 2 stops the printing operation.

On the other hand, if the selection result is an affirmative option (S15: A), the tape printer 2 starts the image processing program product 84, and performs corresponding image processing on the image data A (the character strings and/or image data) stored in the image data storage area 81 (S16) (a printing image data generation step). That is, first, the tape printer 2 extracts, from the processing pattern table 85, a processing pattern according to the type of the printing tape T stored in the determination information storage area 82. Next, the tape printer 2 generates image data A for printing (printing image data) by performing corresponding image processing according to the characteristics of each tape printer 2, the characteristics stored in the characteristic information database 83, based on the extracted processing pattern. Then, the tape printer 2 stores the generated image data A (the image data A subjected to the image processing) in the image data storage area 81.

After performing the corresponding image processing, the tape printer 2 prints the image data A subjected to the image processing, the image data A stored in the image data storage area 81, on the printing tape T by using the tape feed motor 36 and the print head 31 (S17) (a tape printing step). This is the end of the operation described above.

With this configuration, at the time of printing of the image data A, a selection screen for making a selection as to whether or not to perform corresponding image processing based on the determination information is displayed, and image processing is performed according to the selection result. This allows the user to check the corresponding image processing to be performed on the image data A and make a selection as to whether or not to perform the corresponding image processing. Therefore, it is possible to prevent printing from being performed after corresponding image processing that the user does not want is performed.

Figure 8:
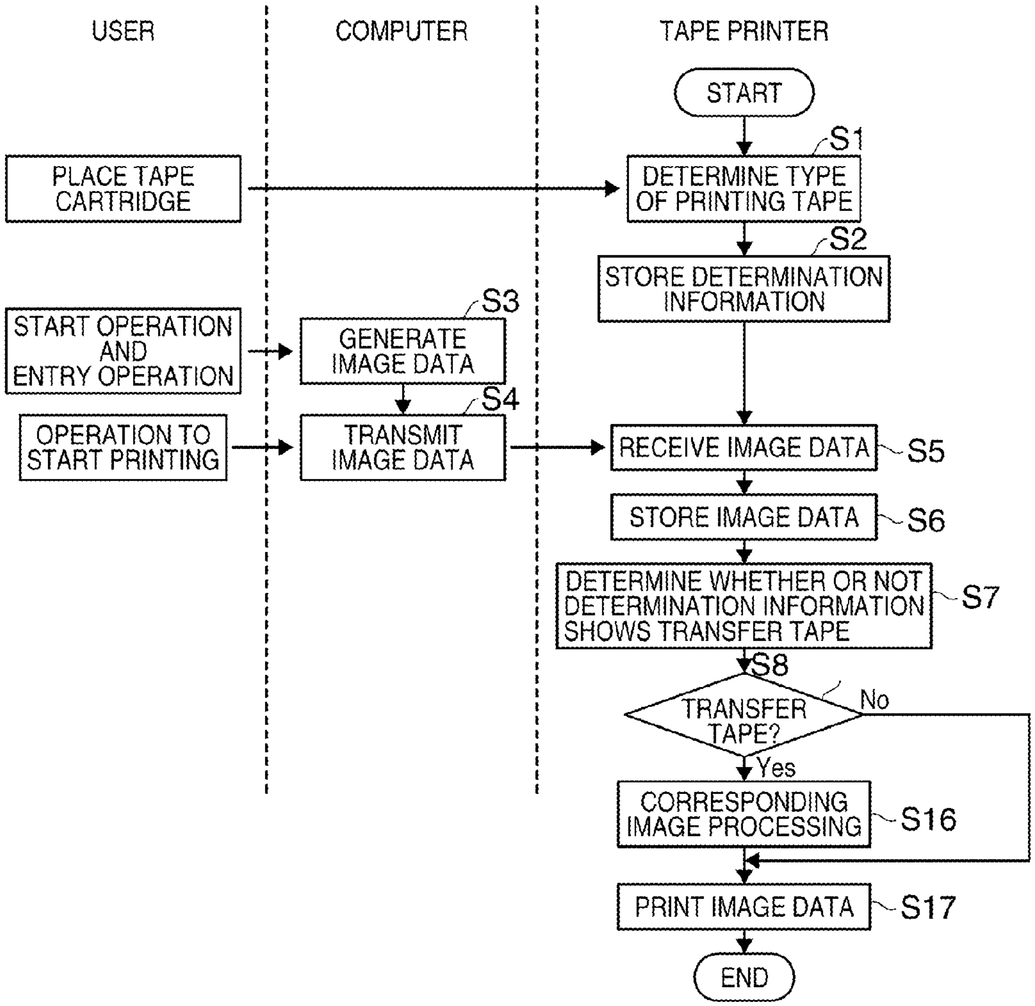
FIG. 8 is a flowchart showing a first modified example of the printing operation.

Here, part of a first modified example, part of a second modified example, and part of a third modified example of the printing operation, the parts which expressly differ from the printing operation described above, will be described with reference to FIGS. 8 to 10. As shown in a flowchart of FIG. 8, in the first modified example of the printing operation, display of a selection screen and a selection made by the user as to whether or not to perform printing (S9 to S15) are omitted. That is, if the type of the printing tape T is determined to be a transfer tape T2 in the tape printer 2 (S8: Yes), the procedure proceeds to corresponding image processing (S16) which is performed on the image data A. With this configuration, by omitting display of a selection screen and a selection made by the user as to whether or not to perform printing, it is possible to perform printing operation efficiently. Hereinafter, in the descriptions of the second modified example and the third modified example, changes from the first modified example will be described.

Figure 9:
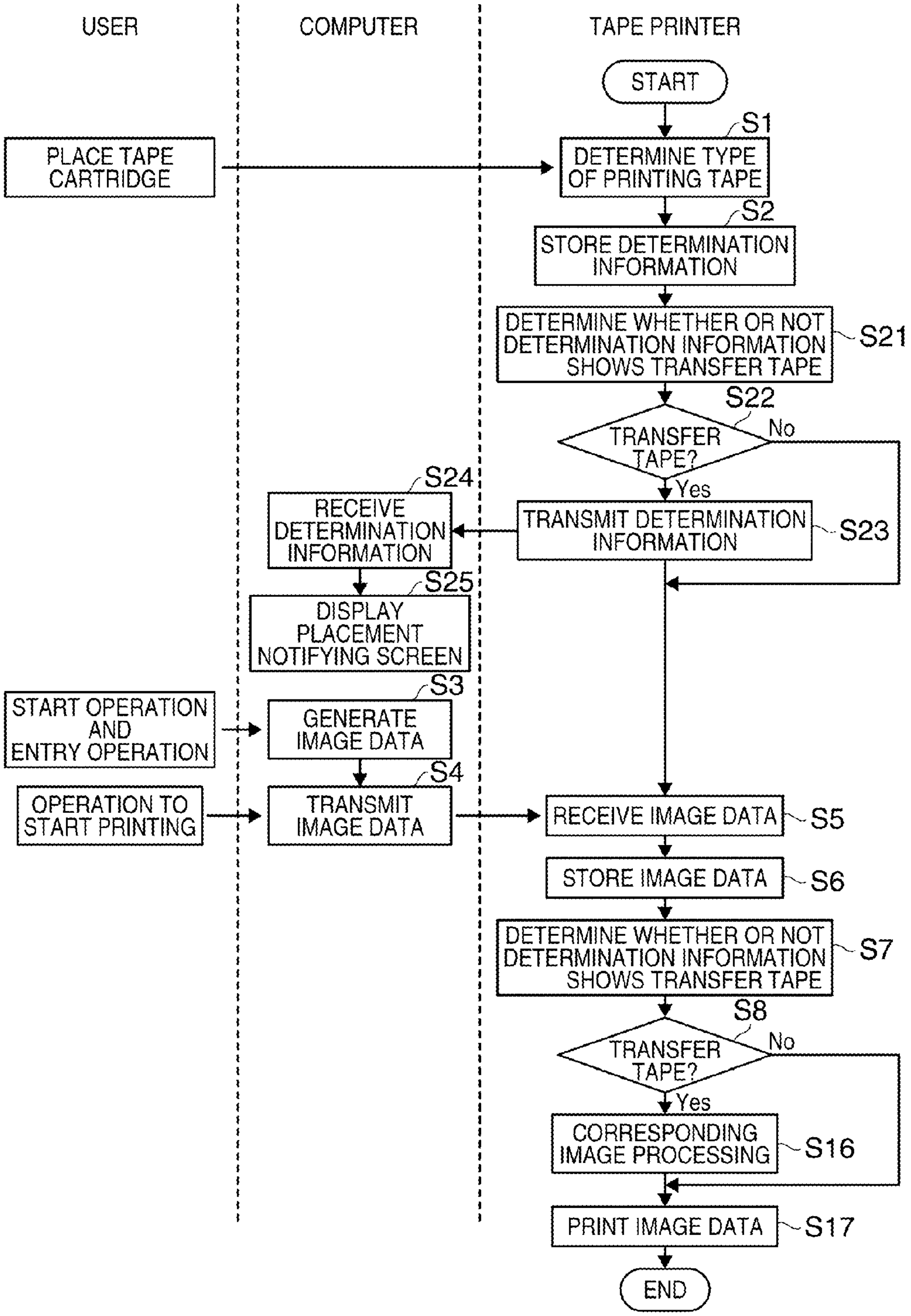
FIG. 9 is a flowchart showing a second modified example of the printing operation.

As shown in a flowchart of FIG. 9, in the second modified example of the printing operation, immediately after determining the type of the printing tape T (S1), the tape printer 2 determines whether or not the type of the printing tape T is a transfer tape T2 (a predetermined type) (S21). If the type of the printing tape T is not a transfer tape T2 (S22: No), the procedure proceeds to the existing step (S3). On the other hand, if the type of the printing tape T is a transfer tape T2 (S22: Yes), the tape printer 2 transmits the determination information (the type of the printing tape T) stored in the determination information storage area 82 to the computer 3 via the communication interface 74 (S23). In response to this, the computer 3 receives the determination information via the communication section 62 (S24), and, immediately after receiving the determination information, displays on the display section 11*a* placement notifying screen notifying that printing is performed after corresponding image processing according to the type (a transfer tape T2) indicated by the received determination information is performed (S25). For example, as shown in FIG. 7B, a placement notifying screen showing a message "A TRANSFER TAPE IS PLACED. AT THE TIME OF PRINTING, IMAGE DATA IS FLIPPED VERTICALLY AND PRINTED BY THE MAIN BODY. [OK]" is displayed. Then, the procedure proceeds to the existing step (S7). With this configuration, when the type of the printing tape T is determined, the user is notified of corresponding image processing according to the determination information and a message saying that printing is performed after the corresponding image processing is performed. This allows the user to check the corresponding image processing to be performed on the image data A.

Figure 10:
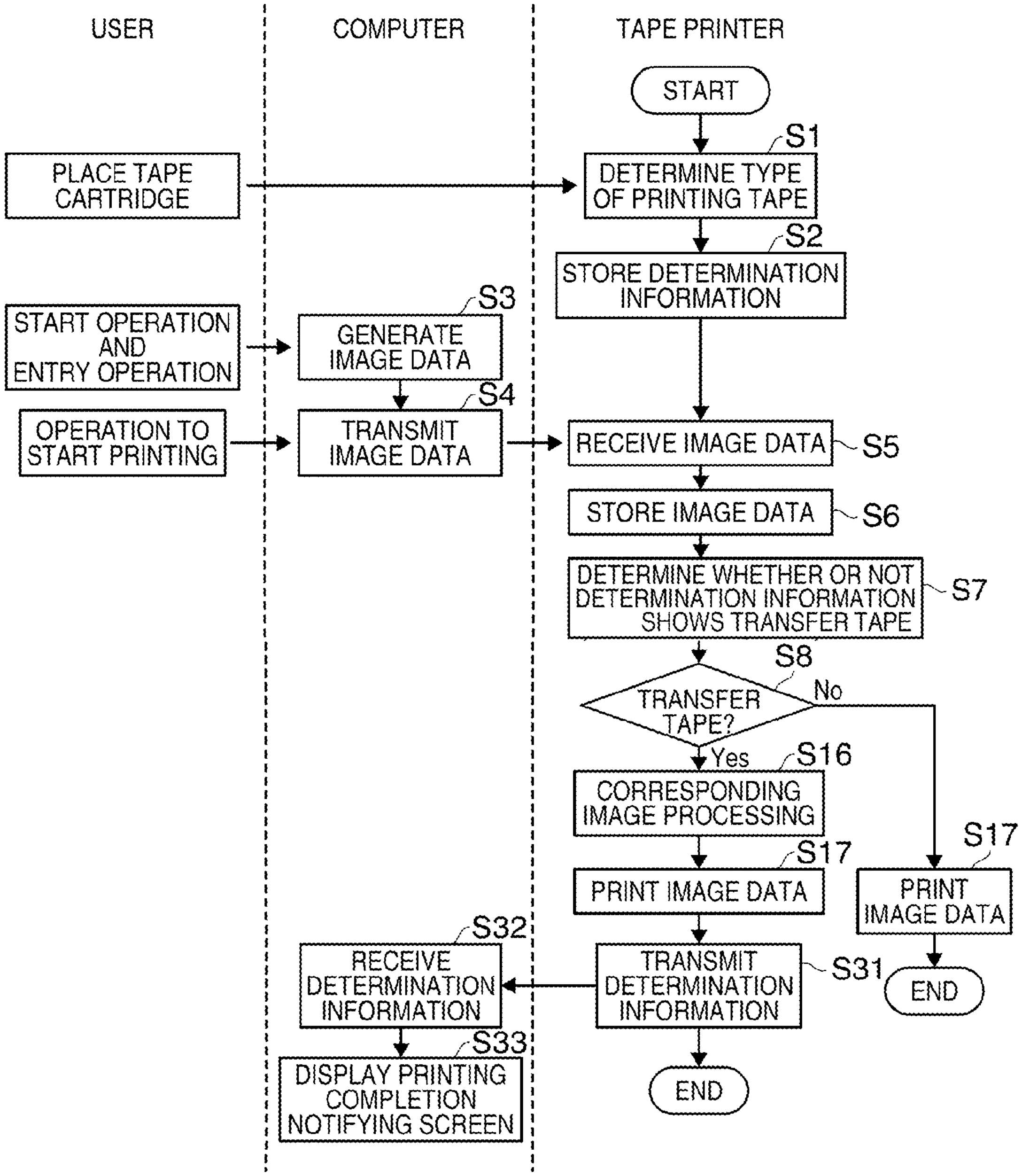
FIG. 10 is a flowchart showing a third modified example of the printing operation.

As shown in a flowchart of FIG. 10, in the third modified example of the printing operation, if the type of the printing tape T is a transfer tape T2 (S8: Yes), after printing the image data A (S17), the tape printer 2 transmits the determination information (the type of the printing tape T) stored in the determination information storage area 82 to the computer 3 via the communication interface 74 (S31). In response to this, the computer 3 receives the determination information via the communication section 62 (S32), and, immediately after receiving the determination information, displays on the display section 11*a* printing completion notifying screen notifying that printing was performed after corresponding image processing according to the type (a transfer tape T2) indicated by the received determination information was performed (S33) (an image processing notifying section). For example, as shown in FIG. 7C, a printing completion notifying screen showing a message "A TRANSFER TAPE IS PLACED. IMAGE DATA WAS FLIPPED VERTICALLY AND PRINTED BY THE MAIN BODY. [OK]" is displayed. This is the end of the printing operation. With this configuration, immediately after the image data A is printed, the user is notified of the corresponding image processing according to the determination information and a message that printing was performed after the corresponding image processing was performed. This allows the user to check the corresponding image processing performed on the printed image data A.

According to the examples described above, since image processing (corresponding image processing) according to the type of the printing tape T and the characteristics of each tape printer 2 is performed in the tape printer 2, it is possible to perform the image processing without performing data communication between the computer 3 and the tape printer 2. This makes it possible to perform image processing according to the type of the printing tape T and the characteristics of each tape printer 2 easily. Moreover, performing the image processing according to the type of the printing tape T and the image processing according to the characteristics of each tape printer 2 at the same time eliminates the need to perform these processing operations separately, making it possible to perform the image processing efficiently.

Incidentally, in this embodiment, it is determined whether or not the type of the printing tape T is a transfer tape T2; however, the invention is not limited thereto as long as it is determined whether or not the type of the printing tape T is a predetermined type. For example, all special tapes other than a most commonly-used normal printing tape T are treated as a predetermined type. That is, the label tape T1 described above is treated as a normal printing tape T, and other printing tapes T (for example, a transfer tape T2, a thermal transfer tape which performs thermal transfer on other members by an iron or the like, a magnet tape having a magnet layer, a cleaning tape for cleaning the print head 31, a cable display tape which is attached to a cable, and a stretch expansion tape with good performance) having material or use which is different from the label tape T1 are treated as a special tape and thus a predetermined type. In such a case, when the printing tape T is determined to be a predetermined type, corresponding image processing corresponding to the type of the printing tape T is performed. In other words, in the examples described above, corresponding image processing for each special tape is performed, that is, if the printing tape T is a transfer tape T2, corresponding image processing corresponding to the transfer tape T2 is performed, and, if the printing tape T is a thermal transfer tape, corresponding image processing corresponding to the thermal transfer tape is performed. Similarly, regarding the display of a selection screen and each notifying screen, display for each type of the printing tape T is displayed.

What is claimed is:

1. A tape printing system comprising a control apparatus that generates character strings and/or image data and a tape printer communicatively connected to the control apparatus, wherein the control apparatus includes:

an image data generating section that generates the character strings and/or image data, and an image data transmitting section that transmits the generated character strings and/or image data to the tape printer, and the tape printer includes:

a tape type determining section that determines a tape type of a printing tape placed in a tape receiving section of the tape printer, a processing pattern storing section that stores, for each tape type, a processing pattern of processing the character strings and/or image data to printing image data, an image data receiving section that receives the character strings and/or image data from the image data transmitting section of the control apparatus, a printing image data generating section that generates printing image data by performing, on the received character strings and/or image data, processing based on the processing pattern according to the tape type determined by the tape type determining section, and a tape printing section that prints the generated printing image data on the printing tape, and wherein the tape type determining section determines whether or not the tape type of the printing tape placed in the tape receiving section is a "transfer tape" which transfers the printing image data printed on the printing tape to another member, and when the tape type is determined to be a "transfer tape", the printing image data generating section performs, as the processing pattern according to the tape type, processing to flip the character strings and/or image data vertically.

2. The tape printing system according to claim 1, wherein the printing image data generating section generates the printing image data by performing, on the received character strings and/or image data, processing according to the characteristics of the tape printer.

3. The tape printing system according to claim 2, wherein when the tape type of the printing tape is determined to be a "transfer tape", the printing image data generating section performs, as the processing according to the characteristics of the tape printer, processing to add a margin region having a length set for each tape printer to front and back parts of a printing region in a tape length direction, the printing region based on the character strings and/or image data.

4. The tape printing system according to claim 2, wherein processing according to the characteristics of the tape printer includes one or more of processing according to the feed rate of the printing tape, processing according to the pressure applied by a print head, and processing according to a head/cutter distance which is a distance between a tape cutter which cuts the printing tape and the print head.

5. A tape printing method of a tape printing system including a control apparatus that generates character strings and/or image data and a tape printer communicatively connected to the control apparatus, the method comprising:

generating, by the control apparatus, the character strings and/or image data;

transmitting, by the control apparatus, the generated character strings and/or image data to the tape printer;

receiving, by the tape printer, the character strings and/or image data from the control apparatus, determining, by the tape printer, the tape type of a printing tape placed in a tape receiving section of the tape printer;

generating, by the tape printer, printing image data by performing, on the received character strings and/or image data, processing based on a processing pattern according to the determined tape type; and printing, by the tape printer, the generated printing image data on the printing tape, wherein the determining of the tape type comprises determining whether or not the tape type of the printing tape placed in the tape receiving section is a "transfer tape" which transfers the printing image data printed on the printing tape to another member, and the processing based on the processing pattern according to the determined tape type includes processing to flip the character strings and/or image data vertically, when the tape type is determined to be a "transfer tape".

6. The tape printing method according to claim 5, wherein the generating of the printing image data further includes performing, on the received character strings and/or image data, processing according to the characteristics of the tape printer.

7. The tape printing method according to claim 6, wherein the processing according to the characteristics of the tape printer includes processing to add a margin region having a length set for each tape printer to front and back parts of a printing region in a tape length direction, the printing region based on the character strings and/or image data, when the tape type of the printing tape is determined to be a "transfer tape".

8. The tape printing method according to claim 6, wherein the processing according to the characteristics of the tape printer includes one or more of processing according to the feed rate of the printing tape, processing according to the pressure applied by a print head, and processing according to a head/cutter distance which is a distance between a tape cutter which cuts the printing tape and the print head.

9. A tape printing method comprising:

allowing a tape printer to receive character strings and/or image data from a control apparatus, allowing the tape printer to determine the tape type of a printing tape placed in a tape receiving section;

allowing the tape printer to generate printing image data by performing, on the received character strings and/or image data, processing based on a processing pattern according to the tape type; and allowing the tape printer to print the generated printing image data on the printing tape, wherein the allowing the tape printer to determine the tape type of the printing tape includes allowing the tape printer to determine whether or not the tape type of the printing tape placed in the tape receiving section is a "transfer tape" which transfers the printing image data printed on the printing tape to another member, and the allowing the tape printer to perform the processing based on the processing pattern according to the tape type includes allowing the tape printer to perform processing to flip the character strings and/or image data vertically, when the tape type is determined to be a "transfer tape".

10. The tape printing method according to claim 9, wherein the allowing the tape printer to generate the printing image data further includes performing, on the received character strings and/or image data, processing according to the characteristics of the tape printer.

11. The tape printing method according to claim 10, wherein the allowing the tape printer to perform the processing according to the characteristics of the tape printer includes allowing the tape printer to perform processing to add a margin region having a length set for each tape printer to front and back parts of a printing region in a tape length direction, the printing region based on the character strings and/or image data, when the tape type of the printing tape is determined to be a “transfer tape”.

12. The tape printing method according to claim 10, wherein the processing according to the characteristics of the tape printer includes one or more of processing according to the feed rate of the printing tape, processing according to the pressure applied by a print head, and processing according to a head/cutter distance which is a distance between a tape cutter which cuts the printing tape and the print head.

* * * * *